United States Patent [19]

Morita et al.

[11] Patent Number: 4,618,542

[45] Date of Patent: Oct. 21, 1986

[54] MAGNETIC THIN FILM

[75] Inventors: Haruyuki Morita; Jiro Yoshinari; Masatoshi Nakayama, all of Tokyo, Japan

[73] Assignee: TDK Corporation, Tokyo, Japan

[21] Appl. No.: 673,987

[22] Filed: Nov. 21, 1984

[30] Foreign Application Priority Data

Nov. 21, 1983 [JP] Japan .................................. 58-217801
Nov. 29, 1983 [JP] Japan .................................. 58-223070

[51] Int. Cl.$^4$ ................................................ G11B 5/64
[52] U.S. Cl. ..................................... 428/694; 360/134; 360/135; 360/136; 427/39; 427/128; 427/130; 427/132; 428/900
[58] Field of Search ................. 427/132, 131, 39, 128, 427/130; 428/694, 695, 900; 360/134–136

[56] References Cited

U.S. PATENT DOCUMENTS 3,206,325 9/1965 Auerbach ............................. 427/132
4,419,381 12/1983 Yamazaki ............................. 427/132

Primary Examiner—Ellis P. Robinson
Attorney, Agent, or Firm—Oblon, Fisher, Spivak, McClelland & Maier

[57] ABSTRACT

A magnetic thin film comprised of at least one, usually two magnetic metals selected from iron, nickel, and cobalt is vapor phase grown on a substrate, for example, polyimide film by introducing chemical compounds of the metals in vapor form, a reducing gas, and optionally, an oxidizing gas, into a vacuum chamber where the substrate is placed and preferably heated to a temperature of at least 100° C., and subjecting the reaction gases to plasma excitation, thereby achieving the vapor phase growth of the magnetic thin film on the substrate.

15 Claims, 1 Drawing Figure

MAGNETIC THIN FILM

The present invention relates to an improved magnetic thin film prepared by a new process. More particularly, it relates to magnetic thin films having high coercive force for use as magnetic recording media, soft magnetic thin films used in thin-film magnetic read/write heads, and other types of magnetic thin films.

BACKGROUND OF THE INVENTION

The processes most widely used to date in fabricating magnetic thin films have been vacuum deposition and sputtering. However, a source material having the same composition as the desired magnetic thin film must first be prepared before these processes can be applied. When a change is to be made in the composition of a magnetic thin film, preparation must commence first with the source material, adding the inconvenience that raises production costs. Moreover, when these processes are used, a rather low proportion of atoms and particles leaving the source material are deposited on the substrate. In vacuum deposition in particular, most of the evaporated atoms and particles are lost through deposition onto the walls in the vicinity of the substrate.

SUMMARY OF THE INVENTION

An object of the present invention is to provide a magnetic thin film fabricated by a new process capable of controlling the composition of the film.

According to a first aspect of the present invention, there is provided a magnetic thin film comprised of at least one magnetic metal and vapor phase grown on a substrate, said thin film being prepared by a process comprising the steps of introducing a chemical compound(s) of the metal(s) in vapor form and a reducing gas into an evacuated vacuum chamber where the substrate is placed, and subjecting the reaction gases to plasma excitation, thereby achieving the vacpor phase growth of the magnetic thin film on the substrate.

According to a second aspect of the present invention, a chemical compound(s) of the metal(s) in vapor form is introduced into the vacuum chamber in the presence of an oxidizing gas as well as a reducing gas.

The magnetic thin films of any desired alloy composition can be produced by the present process by suitably selecting the starting chemical compounds as long as they can be vaporized relatively easily. Moreover, 50–80% of the magnetic metal-bearing compounds can be effectively utilized to form a magnetic thin film.

The properties of these magnetic thin films vary with the substrate temperature during the process. At low substrate temperatures close to room temperature, the resulting magnetic thin film is amorphous and can be used as a soft magnetic material such as in magnetic read/write heads. When the substrate temperature is 100° C. or more, the film becomes crystalline and may be used as a magnetic recording medium. The present invention also encompasses the heat treatment of an amorphous metal film resulting from the above process, and the magnetic thin film thus obtained. Even where the magnetic thin films obtained by the above process are crystalline, should these films be inadequate, they may be heat treated in the same way.

The magnetic thin films obtained in the above manner are crystalline. Because of improved coercive force, they are suited for use in magnetic recording media.

DETAILED DESCRIPTION OF THE INVENTION

Figure 1:
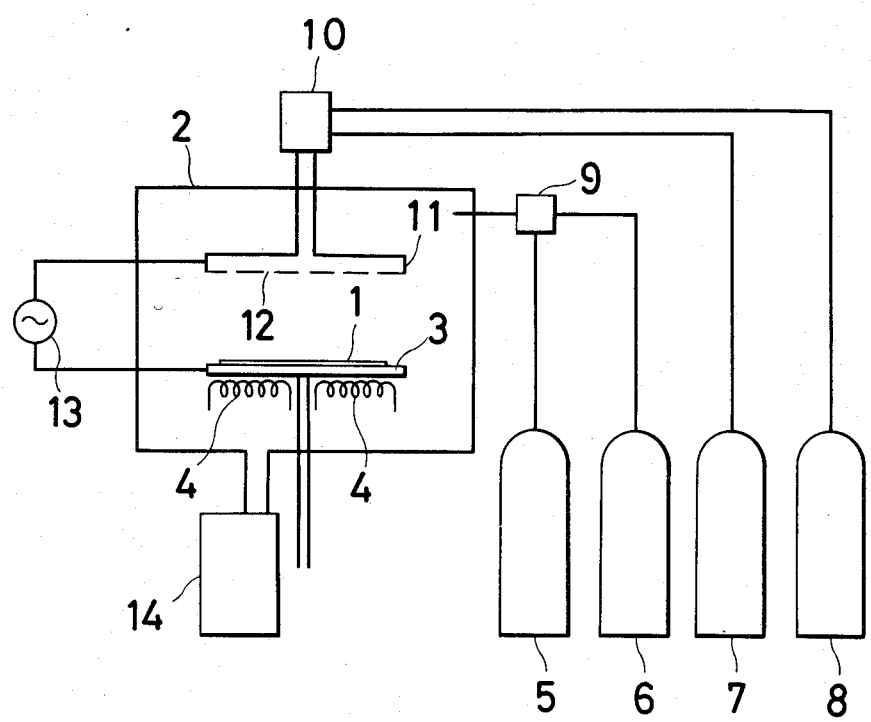
FIG. 1 is a schematic illustration of an apparatus for vapor phase growing a magnetic thin film on a substrate according to the present invention.

In the present invention, the starting gases introduced into the vacuum vessel and plasma-excited are chemical compounds that contain magnetic metal elements, individually in most cases. Some illustrative, but non-limiting examples are carbonyls, halides, acetylacetone salts, biscyclopentadienyls, alcoholates, and other compounds of iron, cobalt, and nickel. Of these, the use of metal carbonyls such as $Fe(CO)_5$, $Co_2(CO)_8$, and $Ni(CO)_4$ is preferable as they are vaporizable at relatively low temperature and can be easily introduced into the vacuum chamber in vapor form.

The reducing gas used in the present invention may be $H_2$, CO, alcohol, and other gases, and mixtures thereof with inert gases such as Ar, $N_2$, He, and $CO_2$. Of these, the use of $H_2$ is especially preferable since hydrogen is easy to handle and to generate a plasma therefrom.

The inclusion of magnetic metal-bearing chemical compounds in vapor form in the reaction gas is important to the present invention, but the inclusion of a reducing gas is especially crucial. The inventors arrived at the present invention after learning through intensive investigations that (a) the use of magnetic metal-bearing chemical compounds alone in vapor form fails to form a magnetic thin film;

(b) a combination of magnetic metal-bearing chemical compounds in vapor form with an oxidizing gas such as $O_2$ often results in powdery products which are not suited to the object of the present invention;

(c) a combination of magnetic metal-bearing chemical compounds in vapor form with an inert gas such as $N_2$ fails to form a magnetic thin film;

(d) a combination of magnetic metal-bearing chemical compounds in vapor form with a reducing gas such as $H_2$ is successful in forming a magnetic thin film; and (e) a combination of magnetic metal-bearing chemical compounds in vapor form with a mixture of reducing and oxidizing gases in proper ratios is successful in forming an oxide-type magnetic thin film.

In the first embodiment based on the above finding (d), the film vapor-phase grown on a substrate via the introduction of a gaseous reaction mixture of gaseous compounds of magnetic metals and a reducing gas into an evacuated vacuum chamber and plasma excitation is amorphous and metallic, and has a low coercive force. This magnetic thin film may be used as soft magnetic material for magnetic heads and the like. However, this magnetic thin film is not ready for use as a magnetic recording medium. The inventors then intended to heat treat the magnetic thin metallic film to find that by heat treating at 200° C. or higher, the metallic film is crystallized to increase its coercive force. If heat treatment is performed in an oxidizing atmosphere, the metal thin film is crystallized in the form of a metal oxide thin film. However, the formation of oxide is undesirable in the case of metallic thin films as it invites a reduction in flux density. The heat treatment should be performed in a non-oxidizing atmosphere. The heat treatment become more effective if it is combined with a plasma in a reducing atmosphere. In other words, because a smaller amount of heat is required for heat treatment in a plasma, mere heating to 100° C. or more is sufficient to fully achieve the desired object.

In the second embodiment of the present invention, metal oxide thin films are produced through the plasma excitation of a metal compound or compounds in the co-presence of reducing and oxidizing gases. This feature is based on the above-mentioned finding (e).

The metal compounds and the reducing gas may be selected from the same groups as mentioned above. Examples of the oxidizing gases include oxygen gas and air, optionally in admixture with an inert gas such as argon, nitrogen and helium. Oxygen gas is most preferred because it is easy to control the degree of oxidation of the resulting film.

The co-presence of the oxidizing gas in the present process depends only whether metallic thin films or metal oxide thin films are suitable for the intended application of the films.

The process of fabricating the magnetic thin film of the present invention will now be described in detail.

Referring to FIG. 1, there is illustrated one example of a plasma device that may be used in the present invention. The first embodiment of the present invention is described wherein a reducing gas is introduced together with gaseous compounds of magnetic metals. A substrate 1 is placed upon a lower electrode 3 within a vacuum chamber 2. The temperature of the substrate is raised by heating the electrode 3 to a suitable temperature with heaters 4. Before conducting vapor phase growth on the substrate 1, the vacuum chamber 2 is evacuated by means of an evacuating unit 14. In order to permit growth of a metal film on the substrate 1, the vacuum chamber 2 should be evacuated to a vacuum of $1 \times 10^{-3}$ Torr or lower. Next, a reducing gas such as hydrogen gas from a cylinder 5 and gaseous compounds such as metal carbonyls from cylinders 7 and 8 are introduced into the vacuum chamber 2 via mixers. The gaseous reaction mixture is blown onto the substrate 1 through perforations 12 in an upper electrode 11. While the interior of vacuum chamber 2 is kept at a vacuum of 0.01 to 10 Torr, a plasma discharge is generated by applying voltage at a high frequency of 13.56 MHz across the electrodes 3 and 11 from an RF power supply 13, thereby achieving the vapor phase growth of a magnetic thin film on the substrate 1.

When the substrate is at a temperature of at least 100° C., the magnetic thin film formed by the present process is a hard magnetic thin film which is crystalline and has a coercive force of several hundred oersteds, and may be used as a magnetic recording medium and the like. When the thin film is formed on the substrate at temperatures as low as room temperature, there is obtained a soft magnetic thin film which is amorphous and has almost zero coercive force, and may be used in magnetic read/write heads.

As noted above, magnetic thin films formed by the present process are either amorphous or insufficiently crystalline when the substrate temperature is relatively low. When a high coercive force is required, the magnetic thin films must be further heat treated. The heat treatment may be carried out in the same vacuum chamber by passing a non-oxidizing gas such as $H_2$ and $N_2$ from the cylinder 5 through the vacuum chamber with the magnetic thin film is place on the electrode 3, and heating the substrate and film to at least 200° C. by means of the heaters 4. When it is desired to carry out the heat treatment in plasma, a non-oxidizing gas such as $H_2$ and $N_2$ is passed in the same way from the cylinder 5, the vacuum chamber 2 controlled to a vacuum of 0.01 to 10 Torr, and a plasma generated by applying RF power. In addition, the substrate and film is heated to at least 100° C. with the heaters 4.

The thus heat-treated magnetic thin film becomes crystalline and attains a coercive force of several hundreds of oersteds, offering excellent properties as a magnetic recording medium.

In the second embodiment of the present invention, magnetic thin films are vapor phase grown in the co-presence of reducing and oxidizing gases. More illustratively, referring to FIG. 1, a substrate 1 is placed on a lower electrode 3 in a vacuum chamber 2. The substrate is heated by heating the electrode to a suitable temperature with heaters 4. The vacuum chamber 2 is evacuated by means of an evacuating unit 14, and a reducing gas such as hydrogen gas and an oxidizing gas such as oxygen gas are introduced into the vacuum chamber 2 from cylinders 5 and 6 via a mixer 9, respectively. The mixing ratio of the reducing gas to the oxidizing gas preferably ranges from 99.5:0.5 to 20:80. Smaller amounts of the oxidizing gas outside this range are insufficient to oxidize the magnetic metal thin films, leaving the films in metallic or intermediate oxide state. The use of greater amounts of the oxidizing gas outside this range results in powdery products.

Next, the source materials such as metal carbonyls in vapor form were introduced into the vacuum chamber 2 from cylinders 7 and 8 via a mixer 10. The gaseous mixture of source materials is blown onto the substrate 1 through perforations 12 in an upper electrode 11. While the interior of vacuum chamber 2 is controlled at a vacuum of 0.01 to 10 Torr, a plasma discharge is generated by applying voltage across the electrodes 3 and 11 at a high frequency of 13.56 MHz from an RF power supply 13, allowing a magnetic thin film to vapor grow on the substrate.

When the substrate is at a temperature of at least 100° C., the magnetic thin film formed by the present process in the co-presence of oxidizing gas has a coercive force of several hundred oersteds, and may be used as a magnetic recording medium and the like. When the thin film is formed on the substrate at temperatures as low as room temperature, there is obtained a magnetic thin film which has a low coercive force of several ten oersteds and must be heat treated before it may be used in magnetic read/write heads. In this way, metal oxide magnetic thin films having varying magnetic properties may be formed by simply changing the substrate temperature during film formation and the heat treating parameters.

As mentioned just above, the magnetic metal oxide thin film formed at substrate temperatures of not higher than 100° C. must be subsequently heat treated. On the basis of heat treating experiments under different conditions, a heat treatment at a temperature of at least 200° C. is effective in improving coercive force and other properties as the magnetic recording medium. A heat treatment in plasma is more effective. The heat treatment combined with plasma requires a smaller amount of heat, and heating to at least 100° C. is sufficient to achieve the purpose.

The substrates on which the magnetic thin films may be vapor grown according to the present invention must be heat resistant to some extent because they are heated to about 100° to 200° C. or higher during vapor growth and subsequent heat treatment. Typical examples include heat resistant resin compositions such as polyimide compositions, metals, and glass.

The thin films used herein designate those films having a thickness of 10 μm or less.

Examples of the present invention are given below by way of illustration, but not by way of limitation.

EXAMPLE 1

A substrate 1, i.e., a polyimide film having a thickness of 50 μm was placed on the electrode 3 in the plasma device shown in FIG. 1 The substrate was heated to 200° C. with the heaters 4 while the interior of vacuum chamber 2 was evacuated to $7 \times 10^{-6}$ Torr. Next, 50 cm$^3$ per minute of H$_2$ gas, 200 cm$^3$ per minute of cobalt carbonyl Co$_2$(CO)$_8$, and 50 cm$^3$ per minute of nickel carbonyl Ni(CO)$_4$ were introduced into the vacuum chamber 2 from the cylinders 5, 7, and 8, respectively. While the interior of vacuum chamber 2 was controlled to a vacuum of 0.1 Torr, film formation was conducted for 30 minutes by applying across the electrodes a power of 350 watts at a high frequency of 13.56 MHz from the RF power source 13. During this process, 70% of the starting gaseous compounds was effectively utilized in film formation on the substrate, and the remainder deposited on the electrode surface about the substrate.

The film thus fabricated has a thickness of 5000 Å and a composition of Co$_{70}$Ni$_{30}$. It was measured for magnetic properties to have a maximum flux density Bm of 9000 G and a coercive force of 420 Oe.

COMPARATIVE EXAMPLE 1

The procedure of Example 1 was repeated except that the H$_2$ gas fed from the cylinder 5 was replaced by N$_2$ gas. Film formation was performed for 30 minutes under otherwise identical conditions, but a magnetic film was not formed on the substrate.

EXAMPLE 2

Film formation was performed by repeating the procedure of Example 1 except for the following conditions:
Substrate temperature: room temperature
Cylinder 5: H$_2$ 50 cm$^3$/min.
Cylinder 7: Fe(CO)$_5$ 20 cm$^3$/min.
Cylinder 8: Ni(CO)$_4$ 100 cm$^3$/min.
Power: 20 watts at 13.56 MHz All other conditions were the same as in Example 1. The film thus obtained had a composition of Fe$_{22}$Ni$_{78}$, a maximum flux density Bm of 7500 G, a coercive force Hc of 0.01 Oe, and a maximum magnetic permeability μm of 150,000, all excellent properties for use as a magnetic head material.

EXAMPLE 3

A substrate 1 which was a 50-μm polyimide film was placed on the electrode 3 in the plasma device shown in FIG. 1, and the interior of vacuum chamber 2 evacuated to $7 \times 10^{-6}$ Torr. Next, 50 cm$^3$ per minute of H$_2$ gas, 200 cm$^3$ per minute of cobalt carbonyl Co$_2$(CO)$_8$, and 50 cm$^3$ per minute of nickel carbonyl Ni(CO)$_4$ were introduced into the vacuum chamber 2 from the cylinders 5, 7, and 8, respectively. While the interior of vacuum chamber 2 was controlled at a vacuum of 0.1 Torr, film formation was conducted for 30 minutes by applying a power of 350 watts at a high frequency of 13.56 MHz from the RF power source 13.

The film thus fabricated had a thickness of 5000 Å, and a composition of Co$_{70}$Ni$_{30}$. It was measured for magnetic properties to have a maximum flux density Bm of 9000 G and a coercive force Hc of 10 Oe.

The films were further heat-treated under a variety of conditions. The results are shown in Table 1.

TABLE 1

| Sample No. | Atmosphere | Heating temperature (°C.) | Bm (G) | Hc (Oe) |
| --- | --- | --- | --- | --- |
| 1-1 | — | — | 9,000 | 10 |
| 1-2 | H$_2$ | 100 | 9,500 | 50 |
| 1-3 | H$_2$ | 150 | 9,500 | 100 |
| 1-4 | H$_2$ | 200 | 11,000 | 400 |
| 1-5 | H$_2$ | 250 | 11,000 | 450 |
| 1-6 | H$_2$ | 300 | 11,500 | 460 |
| 1-7 | N$_2$ | 250 | 9,000 | 450 |
| 1-8 | O$_2$ | 250 | 4,000 | 200 |
| 1-9 | H$_2$ plasma | 50 | 9,500 | 100 |
| 1-10 | H$_2$ plasma | 100 | 10,000 | 400 |
| 1-11 | H$_2$ plasma | 150 | 11,000 | 420 |
| 1-12 | H$_2$ plasma | 200 | 11,000 | 450 |

As is apparent from Table 1, magnetic thin films having varying coercive forces can be obtained through heat treatment by varying treating parameters in a non-oxidizing atmosphere or a non-oxidizing plasma. The films may be used in a variety of applications. A suitable choice of such parameters makes it possible to provide magnetic thin films with a coercive force in excess of 400 oersteds. These thin films clearly have excellent properties for use as magnetic recording media.

EXAMPLE 4

The procedure of Example 1 was repeated except that the flow rates of cobalt carbonyl Co$_2$(CO)$_8$ and nickel carbonyl Ni(CO)$_4$ were modified as shown in Table 2. Film farmation was conducted with all other conditions identical to those in Example 1. Table 2 gives the composition, maximum flux density Bm, and coercive force Hc of the resulting films.

TABLE 2

| Sample No. | Co$_2$(CO)$_8$ flow rate (cm$^3$/min) | Ni(CO)$_4$ flow rate (cm$^3$/min) | Film composition | Bm (G) | Hc (Oe) |
| --- | --- | --- | --- | --- | --- |
| 4-1 | 250 | 0 | Co | 12,000 | 400 |
| 4-2 | 225 | 25 | Co$_{85}$Ni$_{15}$ | 10,500 | 510 |
| 4-3 | 200 | 50 | Co$_{70}$Ni$_{30}$ | 9,000 | 420 |
| 4-4 | 175 | 75 | Co$_{55}$Ni$_{45}$ | 7,500 | 370 |
| 4-5 | 150 | 100 | Co$_{45}$Ni$_{55}$ | 6,500 | 300 |

The present invention can thus provide magnetic thin films having a desired coercive force, by introducing a reaction gas containing chemical compounds of magnetic metals in vapor form and a reducing gas. Moreover, by appropriate adjustment of the heat treatment conditions, the coercive force can be substantially increased, permitting use of the thin film in a variety of applications.

The following examples illustrate the co-presence of reducing and oxidizing gases during vapor growth.

EXAMPLE 5

A substrate 1, i.e., a polyimide film having a thickness of 50 μm was placed on the electrode 3 in the plasma device shown in FIG. 1. The substrate was heated to 200° C. with the heaters 4 while the interior of vacuum chamber 2 was evacuated to $7 \times 10^{-4}$ Torr.

Hydrogen ($H_2$) gas and oxygen ($O_2$) gas were then introduced into the vacuum chamber 2 from cylinders 5 and 6, respectively. The mixing ratios by volume of hydrogen to oxygen gas fed are shown in Table 3. The flow rates of hydrogen and oxygen gases totaled to 50 $cm^3$ per minute. Iron carbonyl $Fe(CO)_5$ and cobalt carbonyl $Co_2(CO)_8$ were then introduced into the chamber at flow rates of 200 and 50 $cm^3$ per minute from cylinders 7 and 8, respectively. While the interior of vacuum chamber 2 was controlled to a vacuum of 0.1 Torr, film formation was conducted for 30 minutes by applying across the electrode a power of 350 watts at a high frequency of 13.56 MHz from the RF power source 13.

The properties of the resulting films are shown in Table 3. Particularly excellent magnetic metal oxide thin films having a high coercive force and thus suitable as magnetic recording media are formed when hydrogen is mixed with oxygen in a ratio by volume of from 99.5:0.5 to 20:80.

TABLE 3

| Sample No. | $H_2:O_2$ | Bm (G) | Hc (Oe) |
| --- | --- | --- | --- |
| 5-1* | 100:0 | 10,000 | 200 |
| 5-2 | 99.8:0.2 | 3,000 | 120 |
| 5-3 | 99.5:0.5 | 5,000 | 430 |
| 5-4 | 99:1 | 5,000 | 450 |
| 5-5 | 90:10 | 4,900 | 470 |
| 5-6 | 80:20 | 4,900 | 470 |
| 5-7 | 70:30 | 4,900 | 460 |
| 5-8 | 60:40 | 4,900 | 460 |
| 5-9 | 50:50 | 4,800 | 450 |
| 5-10 | 40:60 | 4,800 | 450 |
| 5-11 | 30:70 | 4,800 | 430 |
| 5-12 | 20:80 | 4,800 | 420 |
| 5-13 | 10:90 | 4,200 | 200 |
| 5-14** | 0:100 | — | — |

*metallic thin film
**powdery deposit

EXAMPLE 6

The procedure of Example 5 was repeated except that the substrate was heated to varying temperatures as shown in Table 4 while the mixing ratio of hydrogen to oxygen gas was fixed to 90:10 by volume. The magnetic properties of the resulting thin films are shown in Table 4. It is evident from Table 4 that the magnetic thin films grown at substrate temperatures of at least 100° C. exhibit a high coercive force and are thus suitable as magnetic recording media.

TABLE 4

| Sample No. | Substrate Temp. (°C.) | Bm (G) | Hc (Oe) |
| --- | --- | --- | --- |
| 6-1 | 25 | 5,000 | 50 |
| 6-2 | 50 | 5,000 | 100 |
| 6-3 | 100 | 5,000 | 400 |
| 6-4 | 150 | 4,900 | 450 |
| 6-5 | 200 | 4,900 | 470 |
| 6-6 | 250 | 4,900 | 470 |
| 6-7 | 300 | 4,800 | 480 |
| 6-8 | 350 | 4,800 | 480 |

EXAMPLE 7

Samples 6-1 prepared in Example 6 were further heat treated under varying conditions in a flow of oxygen gas at a flow rate of 50 $cm^3$ per minute. The results are shown in Table 5. The data shows that by carrying out the heat treatment at temperatures of at least 200° C. or at temperatures of at least 100° C. in a plasma, there are produced magnetic thin films having a coercive force in excess of 400 Oe and thus suitable as magnetic recording media.

TABLE 5

| Sample No. | Heating Temp. (°C.) | Bm (G) | Hc (Oe) |
| --- | --- | --- | --- |
| 7-1 | 100 | 5,000 | 80 |
| 7-2 | 150 | 5,000 | 190 |
| 7-3 | 200 | 5,100 | 430 |
| 7-4 | 250 | 5,100 | 450 |
| 7-5 | 300 | 5,000 | 470 |
| 7-6 | 50 in plasma | 5,000 | 200 |
| 7-7 | 100 in plasma | 5,000 | 410 |
| 7-8 | 150 in plasma | 4,900 | 430 |
| 7-9 | 200 in plasma | 5,000 | 470 |

EXAMPLE 8

Magnetic thin films were produced by repeating the procedure of Example 1 except that the mixing ratio of hydrogen to oxygen gas was fixed to 90:10 by volume and the iron carbonyl and cobalt carbonyl were fed at varying flow rates as shown in Table 6. The results are shown in Table 6.

TABLE 6

| Sample No. | $Fe(CO)_5$ flow rate ($cm^3$/min) | $Co_2(CO)_8$ flow rate ($cm^3$/min) | Film composition* | Bm (G) | Hc (Oe) |
| --- | --- | --- | --- | --- | --- |
| 8-1 | 250 | 0 | $Fe_3O_4$ | 4,800 | 400 |
| 8-2 | 225 | 25 | $(Fe_{90}Co_{10})_3O_4$ | 4,800 | 440 |
| 8-3 | 200 | 50 | $(Fe_{80}Co_{20})_3O_4$ | 4,900 | 470 |
| 8-4 | 175 | 75 | $(Fe_{70}Co_{30})_3O_4$ | 4,900 | 460 |
| 8-5 | 150 | 100 | $(Fe_{60}Co_{40})_3O_4$ | 4,700 | 450 |

*atomic ratio

The data of Table 6 shows that the composition of the resulting metal oxide thin films can be varied in composition and hence, in magnetic properties simply by varying the ratio of source materials fed.

The present invention can thus provide magnetic thin films having a desired coercive force, by introducing a reaction gas containing chemical compounds of magnetic metals in vapor form, a reducing gas, and an oxidizing gas. Moreover, by appropriate adjustment of the heat treatment conditions, the coercive force can be substantially increased, permitting use of the thin film in a variety of applications.

What is claimed is:

1. A magnetic crystalline thin film comprised of at least one magnetic metal and vapor phase grown on a substrate, said thin film being prepared by a process comprising the steps of
    introducing a chemical compound of the metal in vapor form and a reducing gas into an evacuated vacuum chamber where the substrate is placed,
    subjecting the reaction gases to plasma excitation, thereby achieving the vapor phase growth of the magnetic thin film on the substrate while the substrate is held at a temperature of lower than 100° C., and
    heat treating the metal thin film at a temperature of at least 200° C. in a non-oxidizing atmosphere or at a temperature of at least 100° C. in a non-oxidizing plasma.

2. The magnetic thin film according to claim 1 wherein said metal compound is a metal carbonyl.

3. The magnetic thin film according to claim 1 wherein the metal is selected from iron, cobalt, and nickel.

4. The magnetic thin film according to claim 1 wherein the reducing gas is hydrogen.

5. A magnetic crystalline thin film comprised of at least one magnetic metal oxide and vapor grown on a substrate, said thin film being prepared by a process comprising the steps of introducing a chemical compound of the metal in vapor form, a reducing gas, and an oxidizing gas into an evacuated vacuum chamber where the substrate is placed, the reducing gas and the oxidizing gas being mixed in a ratio by volume of from 99.5:0.5 to 20:80, and subjecting the reaction gases to plasma excitation, thereby achieving the vapor phase growth of the magnetic thin film on the substrate while the substrate is heated to a temperature of at least 100° C.

6. The magnetic thin film according to claim 5 wherein said metal compound is a metal carbonyl.

7. The magnetic thin film according to claim 5 wherein the metal is selected from iron, cobalt, and nickel.

8. The magnetic thin film according to claim 5 wherein said reducing gas is hydrogen.

9. The magnetic thin film according to claim 5 wherein said oxidizing gas is oxygen.

10. A magnetic crystalline thin film comprised of at least one magnetic metal oxide and vapor grown on a substrate, said thin film being prepared by a process comprising the steps of introducing a chemical compound of the metal in vapor form, a reducing gas, and an oxidizing gas into an evacuated vacuum chamber where the substrate is placed, the reducing gas and the oxidizing gas being mixed in a ratio by volume of from 99.5:0.5 to 20:80, subjecting the reaction gases to plasma excitation, thereby achieving the vapor phase growth of the magnetic thin film on the substrate while the substrate is held at a temperature of lower than 100° C., and heat treating the magnetic thin film at a temperature of at least 200° C. or at a temperature of at least 100° C. in plasma.

11. The magnetic thin film according to claim 10 wherein said metal compound is a metal carbonyl.

12. The magnetic thin film according to claim 10 wherein the metal is selected from iron, cobalt, and nickel.

13. The magnetic thin film according to claim 10 wherein said reducing gas is hydrogen.

14. The magnetic thin film according to claim 11 wherein said oxidizing gas is oxygen.

15. The magnetic thin film of claim 10, wherein the heat treatment is carried out in an oxidizing atmosphere.

* * * * *